Figure 1:
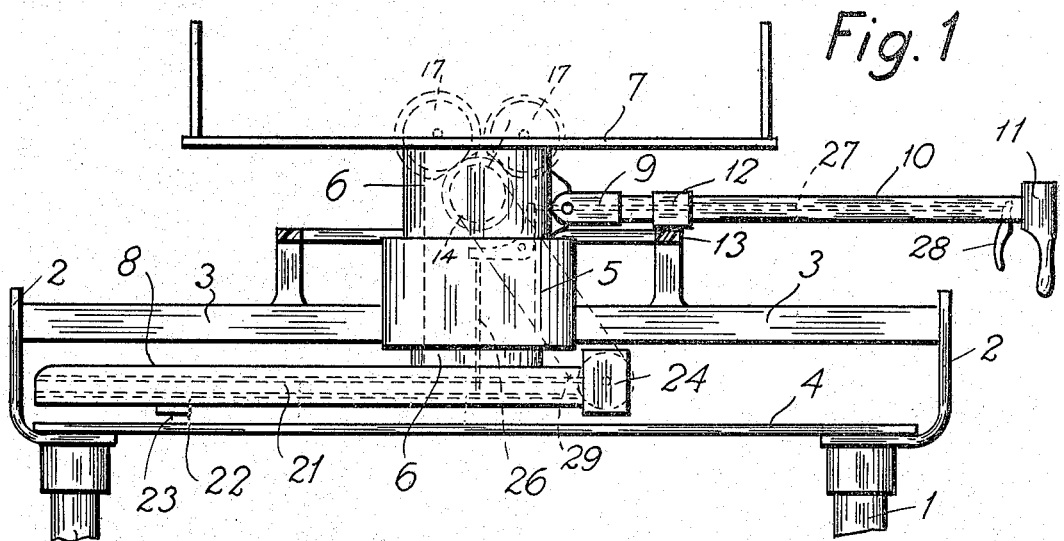

Dec. 13, 1966  E. A. LUND  3,290,782
PLANE TABLE INSTRUMENT
Filed April 20, 1964

INVENTOR
ERIK ARNFRED LUND

BY  Sparrow and Sparrow
ATTORNEYS

United States Patent Office 3,290,782
Patented Dec. 13, 1966

3,290,782
PLANE TABLE INSTRUMENT
Erik Arnfred Lund, 62 Vestergade, Silkeborg, Denmark
Filed Apr. 20, 1964, Ser. No. 360,839
Claims priority, application Denmark, Apr. 19, 1963,
1,830/63
2 Claims. (Cl. 33—1)

This invention relates to plane table instruments, of the kind used for plane table work requiring very exact surveying of relatively small areas measured up by means of an ordinary steel tape measure, which most often has a length of about 50 meters.

To carry out such work it is known to use a diopter connected to a rectlinear rail for a carriage displaceable in the longitudinal direction along the rail and provided with a marking pin, whereby the carriage by means of a transmission mechanism is connected to a measuring wheel for a tape measure, which wheel is rigidly and rotatably mounted relative to the rail in such a manner that the carriage together with the marking pin by an outwardly directed movement of the tape measure is moved along the rail at a gear ratio determined by the transmission mechanism.

In known plane table instruments of this kind one end of the tape measure is fixedly attached to the instrument so that the reaction to the pull necessary for drawing the tape measure outward and for tightening up the same must be performed by the plane table instrument itself. It has been found that this causes inexactitudes in the measuring, especially in the event of sudden jerks occuring in the measuring line, for instance because of sudden gusts of wind thus rendering the setting of the diopter unreliable.

It is a main object of the invention to provide a robust and very stable and exact plane table instrument of this kind constructed in such a way that such faults and inexactitudes surely are obviated by using the same and in which the forces necessary for the tightening of the tape measure are counterbalanced outside the instrument.

Moreover, it has been found that it is unfortunate in the known instruments that the axis of the instrument is mounted directly on the drawing board. In the known instruments the necessary mounting must be constructed to take up the mentioned pulls and pressures and therefore must be very solid. Therefore the fixture and the drawing board will occupy a considerable space on which no drawing paper can be placed, and where consequently no plotting can be performed. Therefore it is not possible in making use of said known apparatus to plot the most adjacent points to be surveyed.

Another object of the invention is to remedy said drawback by providing an instrument whose drawing board is quite free and accessible for plotting everywhere.

According to the invention the drawing board, which is unshakably connected to legs resting firmly on the ground, is rigidly interconnected with a bridge passing freely across the board and on which the diopter and the rail are rotatably mounted, and which is moreover provided with the measuring wheel serving as a drive for the moving mechanism of the marking pin, which measuring wheel meshes with a tape measure otherwise passing freely past the plane table instrument, and intended to be kept extended parallel to the rail.

By this construction the diopter and the measuring wheel by means of robust and solid bearings, which do not block the drawing surface, are mounted on the bridge supported on the ground by legs, and therefore are well suited for receiving jerks and blows without the same being imparted to the marking mechanism or the drawing board or without giving rise to erroneous setting.

The known instrument of a similar kind has a measuring wheel on which the tape measure is wound, and from which it is rolled off by being pulled forward during the measuring operation. This causes those errors arising from inexactitude in the manufacturing of the tape measure, temperature variations, elasticity of the tape and dirt on the same or on the wheel will be included in full in the final result of the measuring. It is a further object of the invention to obviate these faults, to assure that the measuring wheel is only influenced by that part of the tape measure which is pulled forward across the wheel, whereas it is of no importance for the exactitude of the measuring how that part of the tape measure which is not pulled forward for measuring, is wound up. Consequently the invention makes it possible to use a steel tape measure rolled up in the conventional manner in a coil, handled apart from the instrument. Such a steel tape measure is ordinarily considered to be the most exact measuring instrument for surveying.

In order to obtain a quite secure connection between the measuring wheel and the tape measure and thus to avoid that the tape slips on the disc, the measuring wheel according to the invention is provided with a cylindrical surface adapted for supporting an ordinary steel tape measure for surveying, said surface being provided with uniformly interspaced pins, whereas the tape measure itself is provided with holes interspaced correspondingly along its length.

In the drawing there is shown schematicaally a plane table instrument according to the invention.

FIG. 1 shows the apparatus in side elevation, partly in section, and

Figure 2:
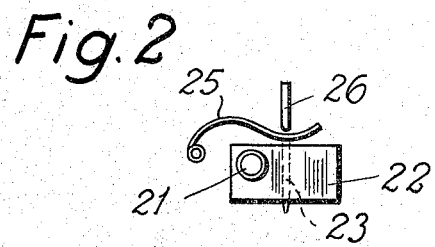
Figure 3:
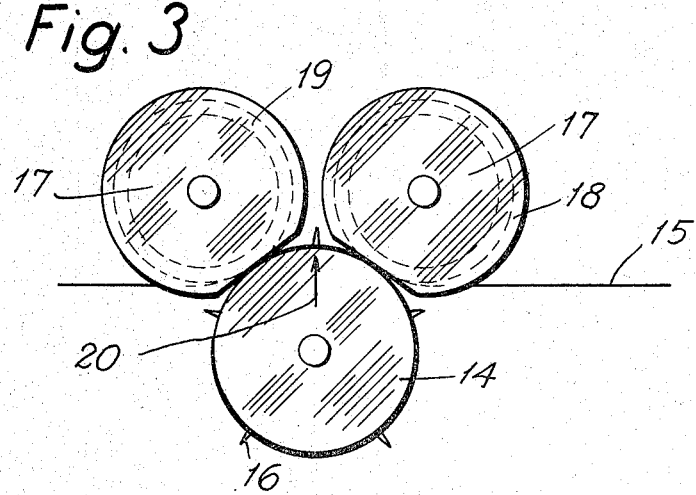

FIGS. 2 and 3 two details on a larger scale.

The plane table instrument according to the invention has solid legs 1 which are able to stand firmly on the ground, and which in the illustrated embodiment is shown in fixed connection with supporting elements 2, but which in well known manner may be rotatably connected to the same and stiffened by stays so that they may be folded during the transport of the instrument.

The supporting elements 2 carry a bridge 3 and a drawing board 4 so that the bridge extends freely across the drawing board at some distance above the same. The bridge 3 being directly connected to the legs 1 consequently constitute a fixed part of the plane table instrument and is provided with all the mechanical parts serving for the setting and the measuring. On the bridge above the drawing board is arranged a solid bearing 5 supporting a vertical shaft 6 which at its top end carries a diopter 7 and at the bottom end a rail parallel to the same but not visible in the drawing because it is enclosed in a jacket 8.

The diopter and the shaft 6 are rotatably connected to a setting handle, which in the illustrated embodiment consists of a sleeve 9 rotatable in a horizontal plane on the shaft 6 and having a tube 10 rotatably inserted into it. On the free end of the tube 10 is fastened a handle 11 to be grasped by the surveyor for swinging the diopter 7 about the vertical axis of the instrument and for directing it at the point to be plotted. On the tube 10 further is fastened a sleeve 12 which may be made of India rubber. When the handle 9–11 is left alone, the sleeve 12 rests against a ring 13 horizontally arranged on the bridge 3. By this arrangement it is rendered possible for the surveyor to undertake a very minute setting of the diopter by rotating the handle 11 about the axis for the tube 10 in the sleeve 9, whereby the sleeve 12 will roll smoothly on the ring and carry the shaft 6 along.

On the shaft 6 is furthermore arranged a measuring wheel 14 shown on a larger scale in FIG. 3. The measuring wheel has a cylindrical surface of such a width that an ordinary steel tape measure 15 for surveying can be supported thereon. On the wheel pins 16 are uniformly interspaced, and holes punched in the tape measure are interspaced correspondingly so that the tape engages the pins thereby ensuring that the wheel 14 follows the tape as the latter is drawn out or in. In order to further ensure that the tape measure is kept in engagement with the measuring disc the shaft opposite the latter is provided with two cylindrical guide discs 17 having flanges 18 engaging around the edges of the tape 15 and the measuring disc 14. The cylindrical face of said discs are arranged at such a distance from the measuring disc 14 that the tape measure 15 is just able to be engaged therebetween. In the cylindrical part of the guide discs is found a groove 19 into which the pins 16 can place themselves when they pass the guide discs. In order to be able from the side to insert a tape in its position engaging the pins on the measuring disc 14, the guide flanges are cut away at a small distance as shown in FIG. 3.

As mentioned the instrument is intended for use in connection with an ordinary steel tape measure for surveying.

Such a tape measure is at its end provided with a ring by means of which the end of the tape measure can be grasped, and from which the zero point of the tape measure is reckoned. As it is impossible to place such a ring between the measuring and the guide discs, the first hole in the tape measure for the pins 16 is arranged in such a distance from the zero point of the tape measure that the distance from zero to the first hole is equal to the arc length travelled by a specially marked pin on the wheel when the same is turned a whole number of rotations preferably a single rotation. For placing the tape into the apparatus the following procedure must be followed: First the measuring disc 14 is turned backwards until the especially marked pin for this purpose as indicated by 20 stands erect in the zero-position of the marked pin. Now the disc 14 is turned the above mentioned number of rotations forward, preferably one rotation forward, so that the mark 20 again points upwards, after which the tape measure is placed on the disc with said pin in the first hole. When thereafter the tape measure is pulled forward the measuring disc 14 will be carried along, and the angle of rotation of the disc, reckoned from the zero-position, will consequently always correspond to the drawn out length of the tape.

In the above mentioned jacket 8, enclosing the rail, is mounted a micrometer screw 21 threadedly engaging a carriage 22 with a plotting pin 23, which in a manner not further shown but well known in the art is displaced along the said rail when the micrometer screw 21 is rotated. The micrometer screw is operatively connected to measuring disc 14 by a transmission diagrammatically shown at 29 in FIGURE 1 and an exchangeable wheel in gear box 24 so that the carriage 22 is pushed forward and backward in the jacket 8 at a gear ratio determined by the motion imparting mechanism, when the measuring wheel 14 is rotated by pulling out or in of the tape measure 15. The carriage 22 will consequently be moved forward and backward in the jacket 8, whereby the distance of the plotting pin from the zero-position, which is occupied when the plotting pin 23 is centrally positioned relative to the shaft 6, always corresponds to the length to which the tape measure 15 has been pulled out. By exchanging the wheels in the gear box 24 the said ratio can be altered.

An element 25 extends through the entire length of jacket 8 and is pivotally attached to the jacket along one of its sides. By means of a spring, not shown, the element 25 is kept in the position shown in FIG. 2 slightly above the carriage 22 and the plotting pin 23. In the middle of the shaft 6 is mounted a displaceable push rod 26 which through a motion imparting connection is connected to a push rod 27 which is mounted in the handle 9–11, and which by a finger on the hand that grasps the handle 11 can be influenced by a trigger 28 rotatable in the handle, so that the latter when pulled in towards the handle 11 pushes the push rod 27 and 26 in which manner the push element 26 hits the rod 25 swinging the latter downwards towards the plotting pin 23 arranged on the carriage 22 thereby causing the same to be pressed downwards to make a mark on a piece of paper placed on the drawing board 4.

In operation a suitable wheel is inserted into the gear box 24 to give the mechanism the desired measuring ratio. Thereafter the measuring disc 14 and the plotting pin 23 are turned back to the zero-position. Now the marking wheel is turned one rotation forward, and the tape is placed by insertion from the side between the measuring disc and the guide disc as mentioned above. The tape measure is held by two helpers of whom one holds the roll on which the main part of the tape measure is rolled up, while the second helper holds the ring on the free end of the tape measure. The helper, who holds the free end of the tape measure, pulls the latter forward to the said point, after which the two helpers together tighten the tape measure, at the same time that the surveyor with his hand on the handle 11 swings the diopter levelling against the point to be measured. Thus a minute setting can be undertaken by rotation of the handle about the axis for the tube 10. When the diopter has been levelled directly against the point, the trigger 28 is operated whereby the plotting pin 23 is pulled down leaving a mark on the drawing paper.

Since the tape measure is almost freely disposed relative to the plane table instrument, any jerk in the tape measure will be taken up by the two helpers without affecting the stand, and the influence to which the plane instrument is nevertheless exposed will be received directly by the bridge 3 and the fixed legs 1 so that all the points plotted on the paper will be reproduced exactly reckoned from the zero-position of the plotting pin, which zero-position can be clearly plotted on the paper so that a hitherto unknown exactitude is easily obtained.

Because the present plane instrument is constructed in such a robust and solid manner as explained, and is not exposed to shakings arising from the tape measure, the surveying can be carried out quickly and without disturbances ascribable to instability in the erection of the stand.

I claim:
1. In a plane table instrument for surveying provided with a diopter connected to a rectilinear rail for a carriage displaceable in the longitudinal direction along the rail and bearing a plotting pin, whereby the carriage by means of a transmission mechanism is connected to a measuring wheel for cooperation with a tape measure, said wheel being rigidly and rotatably mounted relative to the rail in such a manner that the carriage together with the marking pin by drawing the tape measure out or in is moved outwards along the rail at a gear ratio determined by the transmission mechanism, comprising in combination a set of legs (1) for resting on the ground, a drawing board (4) unshakeably attached to said legs, a bridge (3) fixedly connected to said legs and passing above the board and carrying said diopter and said rail, said measuring wheel being engaged by said tape measure, said tape measure being otherwise free of the plane table instrument and borne in tightened position parallel to said rail independent of said instrument.

2. A plane table instrument according to claim 1, in which said measuring wheel (14) has a cylindrical surface adapted for supporting an ordinary steel tape measure (15) for surveying, said cylindrical surface having uniformly interspaced pins (16) and wherein said tape measure along its whole length has holes interspaced correspondingly to said pins.

References Cited by the Examiner

UNITED STATES PATENTS

| | | | |
|---|---|---|---|
| 987,863 | 3/1911 | Cram | 33—141.5 X |
| 1,441,153 | 1/1923 | Jefferson | 33—1 |
| 2,854,753 | 10/1958 | Caparros | 33—139 |

LEONARD FORMAN, *Primary Examiner.*

SAMUEL S. MATTHEWS, *Examiner.*